US012641024B2

(12) United States Patent
Sajassi et al.

(10) Patent No.:   US 12,641,024 B2
(45) Date of Patent:       May 26, 2026

(54) EGRESS FILTERING FOR E-TREE OVER EVPN

(71) Applicant: Cisco Technology, Inc., San Jose, CA (US)

(72) Inventors: Ali Sajassi, Alamo, CA (US); Chuanfa Wang, Ontario (CA)

(73) Assignee: Cisco Technology, Inc., San Jose, CA (US)

( * ) Notice: Subject to any disclaimer, the term of this patent is extended or adjusted under 35 U.S.C. 154(b) by 300 days.

(21) Appl. No.: 18/451,738

(22) Filed: Aug. 17, 2023

(65) Prior Publication Data

US 2025/0062991 A1     Feb. 20, 2025

(51) Int. Cl.
H04L 45/76        (2022.01)
H04L 12/46        (2006.01)
H04L 45/16        (2022.01)

(52) U.S. Cl.
CPC .......... H04L 45/76 (2022.05); H04L 12/4641 (2013.01); H04L 45/16 (2013.01)

(58) Field of Classification Search
None
See application file for complete search history.

(56) References Cited

U.S. PATENT DOCUMENTS

| | | | |
|---|---|---|---|
| 10,103,902 B1 | 10/2018 | Sampath et al. | |
| 10,142,129 B1 | 11/2018 | Gupta et al. | |
| 11,528,223 B2 | 12/2022 | Yong | |
| 12,388,744 B2 * | 8/2025 | Shashidhar | H04L 45/50 |
| 2017/0310598 A1 * | 10/2017 | Boutros | H04L 47/33 |
| 2023/0031683 A1 | 2/2023 | Jiang et al. | |
| 2023/0073266 A1 * | 3/2023 | Boutros | H04L 12/44 |
| 2024/0283732 A1 * | 8/2024 | Shashidhar | H04L 45/32 |
| 2024/0364631 A1 * | 10/2024 | Shashidhar | H04L 45/48 |

* cited by examiner

*Primary Examiner* — Luat Phung
(74) *Attorney, Agent, or Firm* — Lee & Hayes, P.C.

(57)       ABSTRACT

Techniques are described herein for performing filtering of frames by a provider edge device. The techniques comprise receiving information about one or more local customer edge devices in communication with a provider edge device. The techniques further comprise receiving a frame (e.g., a multi-destination frame) at the provider edge device to be provided to multiple customer edge devices. The techniques further comprise, upon determining, based on information included in the frame, that the device at which the frame originated is not a root device, identifying a subset of the set of local customer edge devices associated with a root status and providing the frame to the subset of the set of local customer edge devices while not providing the multi-destination frame to local customer edge devices outside of the subset.

20 Claims, 9 Drawing Sheets

ENVIRONMENT 100

NETWORK 102 (2)

ENDPOINT LAYER 110 (2)

112 (4)

EDGE LAYER 106 (2)

108 (3)

CORE NETWORK 104

PE DEVICES 114 (2)

PE DEVICES 114 (1)

NETWORK 102 (1)

EDGE LAYER 106 (1)

108 (1)

108 (2)

ENDPOINT LAYER 110 (1)

112(1)

112(2)

112(3)

202

```
+-+-+-+-+-+-+-+-+-+-+-+-+-+-+-+-+-+-+-+-+-+-+-+-+-+-+-+-+-+-+-+-+
|R|L|R|R|I|R|R|R| Reserved (24 bits)                          |
+-+-+-+-+-+-+-+-+-+-+-+-+-+-+-+-+-+-+-+-+-+-+-+-+-+-+-+-+-+-+-+-+
| VXLAN Network Identifier - VNI (24 bits)      | Reserved     |
+-+-+-+-+-+-+-+-+-+-+-+-+-+-+-+-+-+-+-+-+-+-+-+-+-+-+-+-+-+-+-+-+
```

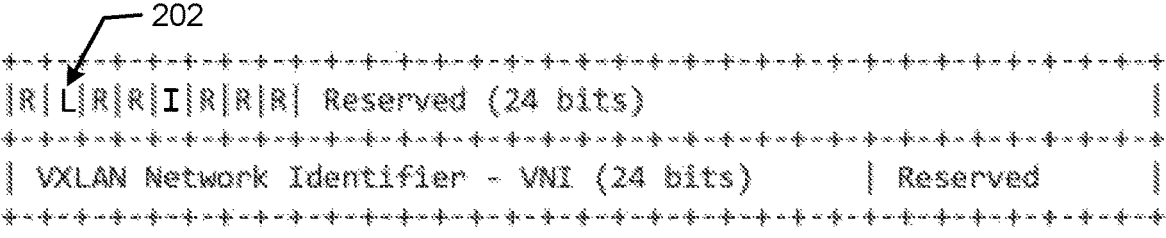

FIG. 2A

```
+-+-+-+-+-+-+-+-+-+-+-+-+-+-+-+-+-+-+-+-+-+-+-+-+-+-+-+-+-+-+-+-+
|R|R|R|R|I|R|R|R| Reserved (24 bits)                          |
+-+-+-+-+-+-+-+-+-+-+-+-+-+-+-+-+-+-+-+-+-+-+-+-+-+-+-+-+-+-+-+-+
|L| VXLAN Network Identifier - VNI (23 bits)    | Reserved     |
+-+-+-+-+-+-+-+-+-+-+-+-+-+-+-+-+-+-+-+-+-+-+-+-+-+-+-+-+-+-+-+-+
```

TABLE 400

| MAC ADDRESS 405 | FORWARDING INFO 410 | ROOT/LEAF 415 |
|---|---|---|
| MAC-A | PORT-1 | ROOT |
| MAC-B | PORT-2 | LEAF |
| MAC-C | PORT-3 | LEAF |
| ⋮ | ⋮ | ⋮ |

RECEIVING INFORMATION ABOUT A SET OF LOCAL
CUSTOMER EDGE DEVICES

604

RECEIVING A FRAME TO BE PROVIDED TO MULTIPLE
CE DEVICES

606

DETERMINING WHETHER AN ORIGINATING DEVICE IS
A ROOT DEVICE

608

IDENTIFYING A SUBSET OF THE SET OF LOCAL
CUSTOMER EDGE DEVICES

610

PROVIDING THE FRAME TO THE SUBSET OF
CUSTOMER EDGE DEVICES

EGRESS FILTERING FOR E-TREE OVER EVPN

TECHNICAL FIELD

The present disclosure relates generally to network devices and, more particularly, to filtering performed by network devices providing packet forwarding in an Ethernet Virtual Private Network (EVPN).

BACKGROUND

A network is a group of interconnected computing devices that can exchange data. A network device is a computing device within the network that is connected to one or more other network devices via one or more physical links. The term "link" is often used to refer to the connection between two devices on a network. The link may be a physical medium, such as a copper wire, a coaxial cable, any of a host of different fiber optic lines, or a wireless connection. In addition, network devices may define "virtual" or "logical" links and map the virtual links to the physical links.

Ethernet is a preferred protocol for many types of networks because it is flexible, decentralized, and scalable. Ethernet comprises a family of frame-based computer networking technologies for local area networks (LANs) and defines a number of wiring and signaling standards for the Physical Layer of the Open Systems Interconnection (OSI) networking model and a common addressing format and Media Access Control (MAC) at the Data Link Layer. Ethernet is flexible in that it allows variable-sized data frames to be transported across different types of mediums using various nodes each having different transmission speeds. Some Ethernet based networks may forward the data frames from one node to another node across the network along pre-configured or pre-established paths. In such cases, the nodes may create Ethernet-LAN (E-LAN) services, where traffic that corresponds to different services may be transported along different sub-networks. For example, the E-LAN services may comprise the Institute of Electrical and Electronics Engineers (IEEE) 802.1 network services or Virtual Private LAN Services (VPLSs).

Ethernet Virtual Private Tree (E-TREE), or rooted point-to-multipoint Ethernet Virtual Connection (EVC), is a Layer 2 service defined by the Metro-Ethernet Forum (MEF) that provides an Ethernet Virtual Local Area Network (VLAN) configuration suitable for multicast services. Illustratively, the Internet Engineering Task Force (IETF) Internet Draft entitled "Requirements for MEF E-TREE Support in VPLS"<draft-ietf-12vpn-etree-reqt> by Key et al. specifies the requirements for supporting MEF E-TREE service in layer-2 virtual private network (L2VPN). Other types of EVCs defined for Carrier Ethernet networking are the E-Line and E-LAN.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A depicts a first example of a frame format that may be used to indicate a leaf status in accordance with at least some embodiments.

FIG. 2B depicts a second example of a frame format that may be used to indicate a leaf status in accordance with at least some embodiments.

FIG. 4 depicts a simplified table (e.g., forwarding table) that may store MAC addresses, corresponding forwarding information, and the newly introduced root/leaf indication.

DESCRIPTION OF EXAMPLE EMBODIMENTS

Overview

Figure 1:
FIG. 1 illustrates a system-architecture diagram showing an environment that includes an example network architecture that may be implemented in accordance with embodiments.

A first method according to the techniques described herein may include receiving information about one or more local customer edge devices in communication with a provider edge device, receiving a frame to be received by to be received by multiple customer edge devices, determining, by the provider edge device based on information included in the multi-destination frame, if a device at which the multi-destination frame originated is a root device, and upon determining that the device at which the multi-destination frame originated is not a root device, identifying, by the provider edge device, a subset of the set of local customer edge devices associated with a root status, and providing, by the provider edge device, the multi-destination frame to the subset of the set of local customer edge devices while not providing the multi-destination frame to local customer edge devices outside of the subset.

Additionally, the techniques described herein may be performed by a system and/or device having non-transitory computer-readable media storing computer-executable instructions that, when executed by one or more processors, performs the method described above.

Example Embodiments

This disclosure describes techniques for providing filtering of frames on a provider edge device within a core network. The provider edge device may be configured to receive and relay communication packets (e.g., frames) to various customer edge devices. In embodiments, the techniques described herein enable the provider edge device to filter out/prevent leaf to leaf frame transmission.

According to one or more embodiments of the disclosure, when a provider edge (PE) device of a computer network domain receives a frame at the PE device, it can determine whether the frame was received on a root or leaf Ethernet ingress segment, and also which local CE devices are associated with a root or leaf Ethernet segment. Accordingly, the PE device may either drop or forward the frame to a subset of local CE devices based on the respective types of the Ethernet segments.

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols and are generally subject to a common authority. To improve routing scalability, a service provider (e.g., an ISP) may divide an AS into multiple "areas" or "levels."

The sites in an E-TREE service have constrained connectivity and are designated as being either Root and/or Leaf. The service is generally set up such that Root sites can communicate with all other sites (Root or Leaf), whereas Leaf sites can communicate with Root sites, but not with other Leaf sites. Many solutions for addressing E-TREE in L2VPN (whether for virtual private LAN service (VPLS), Virtual Private Multicast Service (VPMS) or EVPN rely on an egress-filtering model. This means that a provider edge (PE) device decides on whether to forward or drop traffic destined to an attachment circuit (AC) in order to satisfy the E-TREE connectivity constraints. This model unnecessarily wastes the bandwidth of the Multi-Protocol Label Switching (MPLS) network, in that in order to perform filtering, systems are first required to perform lookup operations to make a leaf/root determination. In ingress filtering, this involves performing a lookup operation to retrieve an indicator flag for a destination MAC. In egress filtering, this involves performing a lookup operation to retrieve an indicator flag for a source MAC. However, performance of such a lookup operation can introduce inefficiencies such as communication delays and additional bandwidth usage.

EVPN E-Tree support is generally defined by RFC 8317, which covers several different deployment scenarios and different traffic flows to/from/between roots and leafs. In scenarios that use EVPN MPLS Encapsulation, a "leaf label" that is advertised in the EAD-ES route (with an ESI of zero) is imposed onto a packet if it's coming from a local leaf AC. This leaf label acts as a "Data Plane Leaf-Indication" which can be used on the disposition side for egress filtering. However, while the egress filtering defined in RFC8317 works well for EVPN MPLS Encapsulation, it may not work for Non-Multi-Protocol Label Switching (Non-MPLS) Encapsulation (like EVPN VXLAN or Geneve), which don't include "leaf label" support.

Embodiments of the disclosure provide for a number of advantages over conventional systems. For example, embodiments as described herein allow for a PE to perform easy identification of a role status (e.g., leaf/root) to be associated with a received frame. Such identification can be made independent of any lookup operation. Accordingly, embodiments enable filtering to be performed in a much more efficient manner.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram showing an environment 100 that includes an example network architecture that may be implemented in accordance with embodiments. Particularly, the example network architecture may include a number of customer networks (102 (1-2)) that are in communication via a core network 104.

An Ethernet Virtual Private Network (EVPN) may be used to extend two or more remote layer two (L2) customer networks (102 (1-2)) through a core layer three (L3) network 104 (usually referred to as a provider network or core network). In particular, the EVPN transports L2 communications, such as Ethernet packets or "frames," between customer networks 102 via traffic engineered label switched paths (LSP) through the core network 104 in accordance with one or more multiprotocol label switching (MPLS) protocols. In a typical configuration, PE devices coupled to the CE network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In embodiments, each of the customer networks 102 may include multiple layers. For example, a customer network 102 may include an edge layer 106 (1-2) that includes a number of customer edge (CE) devices 108 (1-3) that provide egress/ingress to the respective customer network 102. CE devices 108 may include electronic devices such as routers and/or switches. In another example, the customer network 102 may include an endpoint layer 110 (1-2) that includes a number of endpoint devices 112 (1-4). Endpoint devices 112 may include a number of different types of electronic devices. For example, endpoint devices 112 (1-4) are depicted as a mobile phone, tablet-type device, laptop, and desktop computer, respectively. It should be noted that a wide variety of devices are contemplated as an endpoint device 112. The depiction of any particular type of device is for illustration purposes only and is not meant to be limiting.

The core network 104 may include a number of provider edge (PE) devices 114 (1-2) that are configured to provide egress/ingress to the core network 104. In embodiments, PE devices may include any suitable electronic device capable of routing data packets. For example, the PE device may include a server, switch, router, hub, bridge, gateway, modem, repeater, access point, host, or other type of computing device. In embodiments, CE devices of a customer network 102 may connect to PE devices that that include a plurality of ports (e.g., edge devices). In these PE devices, each port may be associated with a E-Tree service, where each of the ports may be configured as a root port or a leaf port (but not both). The root ports and the leaf ports in the PE devices may exchange data frames with other PE devices in the core network 104 using the E-Tree service. Additionally, A root port or a leaf port in a PE device also may be coupled to a CE device 108 of a customer network 102 and exchange data with devices operating on that customer network 102.

Each of the CE devices 108 in a customer network 102 may be connected to one or more PE devices. More particularly, a PE device may maintain a plurality of ports, with each port being assigned to one of its local (e.g., connected) CE devices. Each of the PE devices also maintains information about an identifier or address associated with its local CE devices. For example, the PE device may maintain information about a MAC address associated with each of its ports Additionally, the PE device may maintain information about whether the respective port is a leaf port or a root port based on whether the respective CE device is a root device or leaf device.

In some embodiments, a customer network may be given redundant connectivity to a core network by connecting a CE device with multiple PE devices. This form of redundancy is referred to as "multi-homing." In one type of multi-homing, referred to as "active-active" multi-chassis link aggregation (MC-LAG) configuration, each of the PE devices is configured to actively forward traffic and the multiple, physical links providing the multi-homed connectivity are logically aggregated and treated as a single, logical link. In MC-LAG configured networks, MC-LAG enables a CE network device to form a logical LAG interface between two MC-LAG peer nodes.

The CE devices 108 as well as the PE devices 114 may act as network nodes that support transportation of frames and/or packets through the various networks in the environment 100. Such devices may each be configured to support an E-Tree service to transfer frames across devices. Example solutions for supporting E-Tree services in MPLS/VPLS based networks have been described in the IETF Pseudowire Emulation Edge to Edge version 3 (PWE3) workgroup (WG) and the L2VPN WG, such as discussed in the IETF documents draft-key-12vpn-etree-frwk-04 (E-Tree-Frwk), draft-key-12vpn-vpls-etree-02 (VPLS-E-Tree), and draft-si-mon-pwe3-cw-bit-01 (CW-LBit), all of which are incorporated herein by reference.

In operation, the various components of the environment 100 may be configured to relay network traffic (e.g., frames/packets) between each other. Filtering may be performed by a PE device that receives a frame to be sent to a local address. For example, upon receiving a frame, the PE device may determine, based on a destination identifier (e.g., a MAC address) of a device to which the frame is directed or based on whether the frame is a multi-destination frame, whether the frame is to be provided to a local device (e.g., a device in communication with the PE device). If the frame is to be provided to a local device, then another determination can be made as to whether the frame originated at a root or a leaf device. In embodiments, such a determination may be made based on an indicator that is included in the frame. In some cases, such an indicator may be a single bit that is included in a header of the frame. In other cases, such an indicator may be included as a single bit included in a body of the frame.

If the frame originated at a root, then the frame can be forwarded to each of the local CE devices. Otherwise, the PE device may be configured to prevent transmission of the frame to any local CE device that is a leaf device.

FIGS. 2A and 2B depict multiple examples of information formats that may be used to indicate leaf status in a frame. Each of the examples depicted in FIGS. 2A and 2B are illustrated in regard to VXLAN encapsulation. However, one skilled in the art would recognize that the embodiments could be implemented using other encapsulation schemes. VXLAN is an example of an encapsulation protocol that provides data center connectivity using tunneling to stretch Layer 2 connections over an underlying Layer 3 network. In data centers, VXLAN is the most commonly used protocol to create overlay networks that sit on top of the physical network, enabling the use of virtual networks.

FIG. 2A depicts a first example of a frame format that may be used to indicate a leaf status in accordance with at least some embodiments. The first example depicted in FIG. 2A represents an example of an embodiment in which a leaf indication may be included in a header of a frame.

As defined in the standard for RFC 8317, a VXLAN header may include a sequence of reserved bits that are not otherwise assigned. In such cases, a bit at a position within the reserved bits may be assigned to carry an indicator of a leaf/root status. By way of illustration, an indicator 202 is depicted as being included at a second position within the reserved bits.

In some embodiments, the indicator may include a single bit. For example, the indicator may be populated with a value of "1" if the frame originated at a leaf or a value of "O" if the frame originated at a root. In some embodiments, the indicator may be added to the header by the device that originates the frame. In some embodiments, the indicator may be added to the header by a PE device that first receives the frame from a CE device based on a classification of the port over which the frame was received.

FIG. 2B depicts a second example of a frame format that may be used to indicate a leaf status in accordance with at least some embodiments. It should be noted that while some embodiments may include the indicator 202 as included in the header of a frame as depicted in the first example, some devices may not be capable of processing such a frame. For example, legacy devices may not be configured (or configurable) to determine a leaf or root status from reserved bits within the header. In such cases, an indicator 204 may be included within the frame outside of the header.

In embodiments, an indicator 204 may be included within a network identifier (e.g., a VXLAN Network Identifier (VNI)). For example, such an identifier may be a sequence of 24 bits where the first bit of that identifier is assigned as an indication of whether the frame originated at a leaf. It should be noted that while including the indicator within an identifier enables legacy devices to make a determination as to whether the frame originated at a leaf, this would reduce the range of identifier values by half. Accordingly, an embodiment as described in the second example may be preferable when devices are unable to process frames that include an indicator within a header where the embodiment as described in the first example may be preferable when devices are able to process frames that include an indicator within the header.

Figure 3:
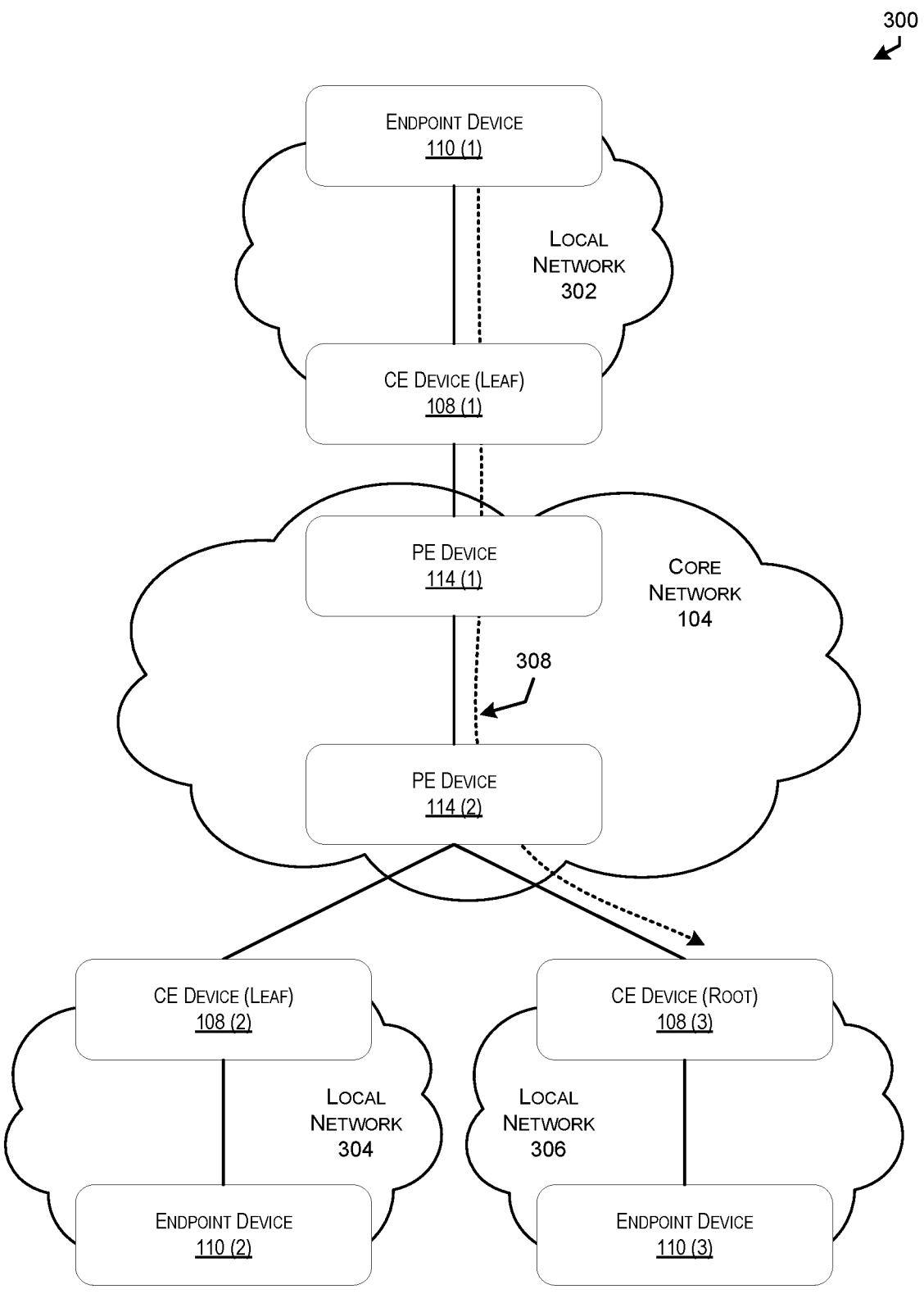
FIG. 3 depicts an example of a process of egress filtering that may be performed by a PE device in accordance with some embodiments.

FIG. 3 depicts an example of a process of egress filtering that may be performed by a PE device in accordance with some embodiments. As depicted, the process 300 may involve interactions between various components as described in relation to FIG. 1 above. For example, a core network 104 may include (amongst other devices) a number of PE devices 114 (1-2) that are configured to relay frames between network devices. In this example, the core network 104 may connect multiple local networks 302, 304, and 306. Each of those local networks 302, 304, and 306 may include CE devices 108 in communication with (and associated with) the PE devices 114.

While reference is made to a CE device being a "root device" or a "leaf device," it should be noted that such classifications may be made by provider edge devices based on information (e.g., configuration settings) related to the respective CE devices. Such classifications may be maintained in relation to the CE device and/or a port associated with the CE device.

In an example process as depicted in FIG. 3, a frame is generated by a first endpoint device 112 (1) that is to be transmitted to at least one second endpoint device 112 (2 or 3). This may involve broadcasting the frame to multiple endpoint devices. In the process 300, the frame is transmitted by the endpoint device 112 (1) to a CE device 108 (1) via a communication connection over the first local network 302. The frame is then transmitted to a PE device 114 (1) in communication with the CE device 108 (1). It should be noted that, for the purposes of this example, the CE device 108 (1) may be classified as a leaf device.

As noted elsewhere, an indicator included in the frame is updated to indicate that it originated at a leaf device. In some embodiments, the indicator is updated by the CE device 108 (1) before the frame is transmitted to the PE device 114 (1). In some embodiments, the indicator is updated by the PE device 114 (1) when it is received from the CE device 108 (1). In some cases, the frame may include an indication of one or more destination device (e.g., a MAC address).

The PE device 114 (1) may relay the frame to at least one second PE device 114 (2) within the core network 104. In some cases, the PE device 114 (2) forwards the frame to additional PE devices in the core network 104. Each of those PE devices 114 may, upon receiving the frame, determine if the frame originated at a leaf or a root based on the indicator included in the frame. If the frame is determined to have originated at a root device, then the frame may be forwarded to its destination regardless of a type of that destination device. Otherwise (e.g., if the frame originated at a leaf device), a determination may be made as to whether the frame should be relayed to at least one CE device 108 with which it is in communication. In some cases, this may involve performing a lookup in a forwarding table (e.g., as described in relation to FIG. 4 below) to identify each device that is classified as a root device.

In this case, since the frame originated at a leaf device, the PE device may only forward the frame to the CE devices in communication with the PE device 114 (2) that are classified as a root device. Accordingly, the PE device may drop the frame if it originated at a leaf device and the PE device is not in communication with any CE devices classified as root devices.

In an example of the process 300, a frame 308 is originated at endpoint device 112 (1), classified as a leaf device. In this example, the frame 308 is conveyed to the CE device 108 (1) and subsequently to PE device 114 (1). As noted above, an indicator is added to the frame 308 to indicate that the frame originated at a leaf device. The frame 308 is then forwarded to the PE device 114 (2).

Upon receiving the frame 308, the PE device 114 (2) determines that the frame 308 originated at a leaf device (e.g., based on the included indicator). Upon making that determination, the PE device 114 (2) then generates a subset of local CE devices that are each classified as root devices (e.g., by performing a lookup using a forwarding table). In the depicted scenario, a determination is made by the PE device 114 (2) that the CE device 108 (3) is a root device based on information included in a forwarding table.

The PE device 114 (2) then transmits the frame 308 to each of the CE devices included in the generated subset of CE devices. The PE device 114 (2) does not forward the frame to any CE devices outside of the subset of CE devices (e.g., those that are leaf devices). If the PE device 114 (2) determines that there are no local CE devices that are root devices (e.g., the subset is empty), then the PE device 114 (2) may drop the frame.

FIG. 4 depicts a simplified table 400 (e.g., forwarding table) that may store MAC addresses 405, corresponding forwarding information 410, and the newly introduced root/leaf indication. Those skilled in the art will appreciate that the simplified table 400 is merely for illustration and is not meant to be limiting to the scope of the embodiments herein (e.g., other information and/or formats may achieve similar results yet may still be used in accordance with the techniques herein to indicate whether the address was learned over a Root or Leaf segment).

The forwarding table 400 illustrated herein may be specific to a PE device on which the forwarding table is stored. In other words, the forwarding table stored on a PE device may include information about devices that are local to (e.g., in communication with) that PE device.

According to the techniques herein, when a PE device receives a MAC advertisement message from a CE device (e.g., when a CE device is connected to the network), it adds/updates the role status (e.g., a "Root/Leaf") indication on a per MAC address basis in its forwarding table. This may be a single-bit flag associated with every MAC address table entry. As such, when the PE receives Ethernet frames destined to a given MAC address, it would (provided that the MAC address is determined to correspond to a local device) then:

1. Determine whether the frame is associated with a Root or Leaf based on an indicator included in the frame; and
2. Perform a MAC address table lookup on the destination address to determine whether the destination corresponds to a Root or Leaf.

The ingress PE can then decide whether to drop or forward the frame based on the combination of the MAC lookup and the role status (e.g., Root/Leaf) indicator of the frame, according to the rules of E-TREE forwarding (i.e., root-to-any, any-to-root, and no leaf-to-leaf communication).

Figure 5:
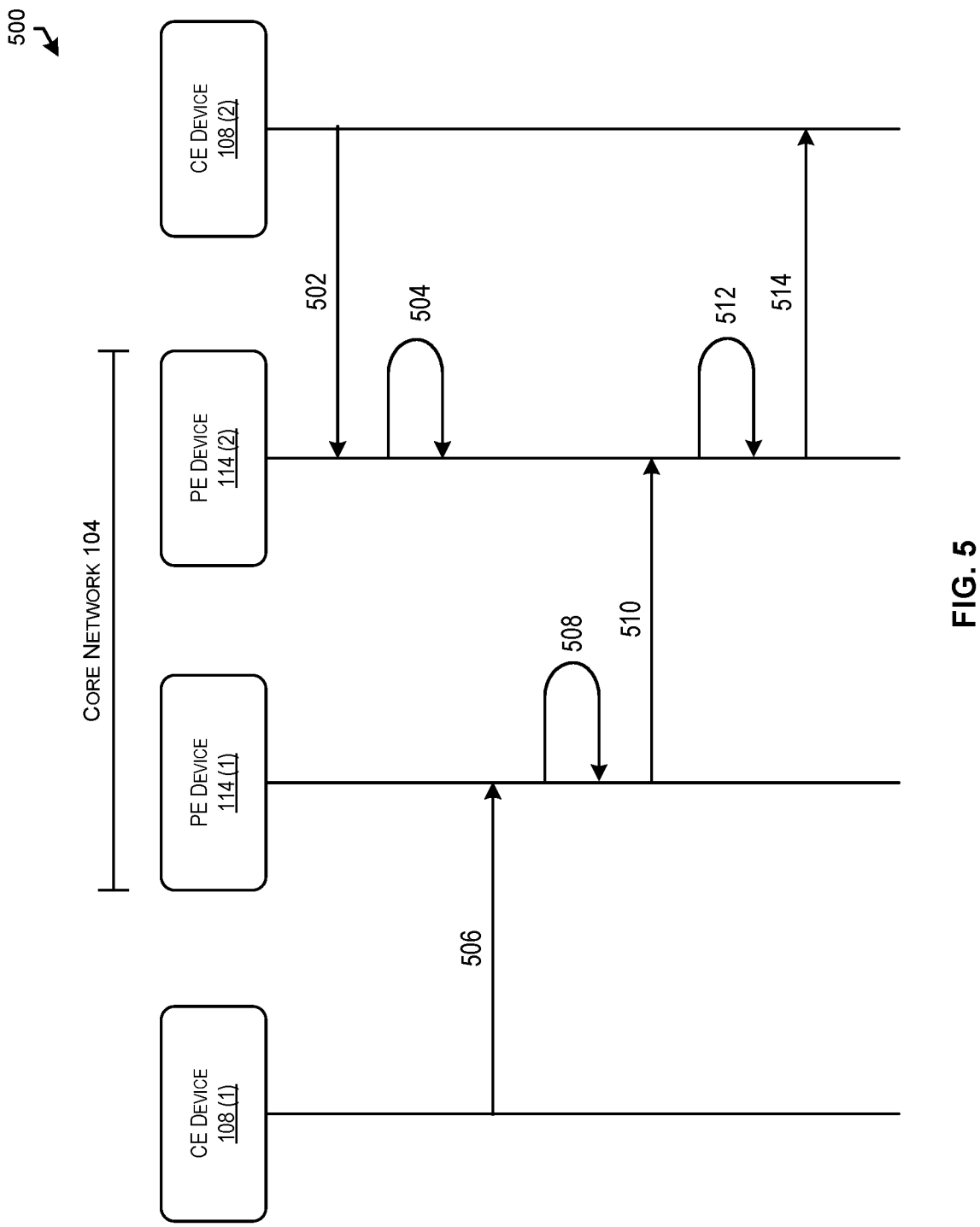
FIG. 5 illustrates a swim lane diagram depicting a process for configuring a customer edge device to receive frames on a network in accordance with at least some embodiments.

FIG. 5 illustrates a swim lane diagram depicting a process 500 for configuring a customer edge device to receive frames on a network in accordance with at least some embodiments. More particularly, the process 500 is depicted in relation to a core network 104 that includes a number of provisional edge devices 114 (1-2) and multiple customer edge devices 108 (1-2) that each provide egress/ingress to a respective local network. Each of the devices may be examples of the respective devices as described in relation to FIG. 1 above.

At 502 of the process 500, a customer edge device 108 (2) may be connected to the core network 104. In embodiments, this might involve a customer edge device 108 discovering a provider edge device 114 (e.g., via a device discovery process). In such embodiments, the customer edge device 108 provides the provider edge device 114 with information that can be used to register the customer edge device with a core network 104 within which the provider edge device operates. In some cases, one or more security certificates are exchanged during a registration process.

At 504 of the process 500, a provider edge device 114 (2) may register the customer edge device 108 with the core network. In some cases, this may involve communicating information about the customer edge device to a backend server that manages one or more aspects of the core network. The provider edge device may further receive, and relay to the customer edge device, access credentials from the backend server that can be used by the customer edge device to access the core network via the provider edge device. The PE device may determine, based on information received from the CE device, whether the CE device should be considered to be a root device or a leaf device. In embodiments, such a determination may be made based on configuration data and/or policies.

In some cases, the provider edge device may store information about the customer edge device 108 in its memory. In some cases, such information may be stored in a forwarding table, such as the forwarding table 400 as described in relation to FIG. 4 above.

As noted above, the information stored by a provider edge device in relation to a customer edge device with which it is in communication may include an indication as to a port used to communicate with the customer edge device, an identifier for the customer edge device (e.g., a MAC address), and/or an indication of whether the customer edge device is a leaf device or a root device. In embodiments, the table may maintain information about customer edge devices in direct communication with the provider edge device, such that each of the customer edge devices that are included in the table may be considered local customer edge devices to that provider edge device.

At 506 of the process 500, subsequent to the customer edge device 108 (2) establishing communication with the provider edge device 114 (2), a second customer edge device 108 (1) may transmit a frame to a second provider edge device 114 (1) operating on the core network 104. In some embodiments, the customer edge device 108 (1) may include an indication within the frame as to whether that customer edge device is a root device or a leaf device. In some cases, such an indication may be added to a reserved series of bits within the header as a single bit indicator. In some cases, such an indication may be added to a series of bits that represents an identifier included in the frame (e.g., a VNI).

At 508 of the process 500, the second provider edge device 114 (1), upon receiving the frame from the customer edge device 108 (1), may make a determination as to whether the frame was received from a root device or a leaf device. In some embodiments, this may involve retrieving information about the customer edge device from a table (e.g., forwarding table 400) maintained by that provider edge device. In some embodiments, the provider edge device 114 (1) may add an indication to the frame as to whether that customer edge device is a root device or a leaf device. For example, the provider edge device 114 (1) may add such an indication in embodiments in which it is not added to the frame by the customer edge device 108 (1). In some cases, the indication may be added to a reserved series of bits within the header as a single bit indicator. In some cases, the indication may be added to a series of bits that represents an identifier included in the frame (e.g., a VNI).

At 510 of the process 500, the provider edge device 114 (1) may transmit the received frame to a number of other provider edge devices operating on the core network, including the provider edge device 114 (2). It should be noted that the provider edge device 114 (1) and the provider edge device 114 (2) may not be in direct communication, such that communications between the two provider edge devices may be routed through a number of core network devices.

At 512 of the process 500, upon receiving the frame, the provider edge device 114 (2) may make a determination as to whether the frame should be relayed to a local customer edge device (e.g., a customer edge device included in a table stored in memory of the provider edge device 114 (2)). In some cases, the provider edge device 114 (2) may make a determination as to whether the customer edge device 108 (1) from which the frame originated is a leaf device or a root device. In embodiments, this may involve checking the indication of a leaf/root status that was added to the frame by the provider edge device 114 (1) at 508.

If the customer edge device 108 (1) is determined to be a leaf device, then the provider edge device may determine which of its local CE devices should receive the frame. This may involve retrieving information about the local customer edge devices from the table maintained by the provider edge device related to a role (e.g., leaf/root) status of the respective customer edge devices.

If the customer edge device 108 (2) is determined to be a root device, then the customer edge device 108 (2) is identified as one of the CE devices to which the frame should be forwarded. In this scenario, the frame is transmitted by the provider edge device 114 (2) to the customer edge device 108 (2) at 514. It should be noted that regardless of whether the provider edge device 114 (2) provides the frame to the customer edge device 108 (2), the frame may be provided to a number of other network devices (e.g., provider edge devices or other types of network devices) within the core network 104.

Figure 6:
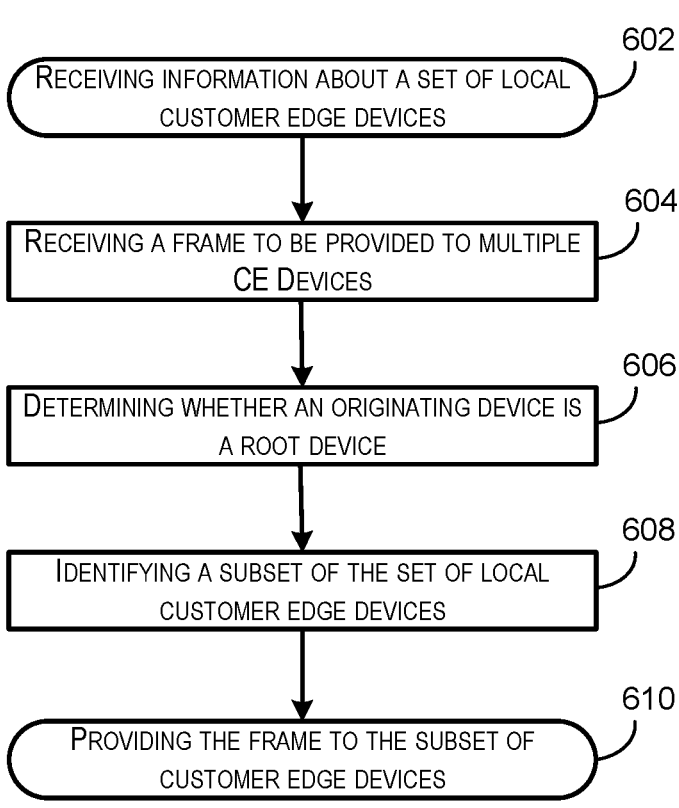
FIG. 6 depicts a flow diagram illustrating an exemplary process for performing filtering of frames in accordance with at least some embodiments.

FIG. 6 depicts a flow diagram illustrating an exemplary process for performing filtering of frames in accordance with at least some embodiments. The process 600 may be performed by provider edge device, such as the provider edge device 114 as described in relation to FIG. 1 above.

At 602, the process 600 may involve receiving information about one or more local customer edge devices at a provider edge device operating within a core network. A provider edge device may be a network device operating on an edge of a core network in order to provide ingress/egress to that core network. A customer edge device may be a network device operating on an edge of a customer network in order to provide ingress/egress to that customer network. A "local" customer edge device may be a customer edge device in direct communication with the provider edge device. In embodiments, each provider edge device may maintain communication with a plurality of customer edge devices. Additionally, each customer edge device may maintain communication with multiple provider edge devices.

As noted elsewhere, the information about a customer edge device may be received at a provider edge device during an enrollment or registration process in which the customer edge device is registered to be operated on the core network. The information provided by the customer edge device to the provider edge device may include at least an identifier (e.g., a MAC address) for the customer edge device. Additionally, the customer edge device may report to the provider edge device whether it is a leaf device or a root device. The information received at the provider edge device in relation to a local customer edge device may be stored by the provider edge device in a table as described elsewhere. In some cases, upon registering a customer edge device, the provider edge device may assign a port to communications with that customer edge device. In this manner, the PE device may maintain information about multiple CE devices that are local to that PE device.

At 604, the process 600 may involve the provider edge device receiving a frame to be transmitted to multiple customer edge devices. In embodiments, the frame may be a multi-destination frame that is to be transmitted to multiple CE devices. Such a frame may not include a target destination.

At 606, the process 600 may involve determining whether the frame originated at a root device or a leaf device. In embodiments, the determination as to whether the frame originated at a root device or a leaf device is made based on an indication included in the frame. The indication may represent a single bit value. In some cases, the indication included in the frame is a bit indicator included in a header of the frame. For example, the indication may be included in a series of reserved bits of the header. In some cases, the indication included in the frame is a bit indicator included in an identifier of the frame. For example, the first bit of the identifier may be assigned to a leaf/root status of the originator of the frame.

At 608, the process 600 may involve identifying a subset of the multiple CE devices that are local to the PE device to receive the frame. In embodiments, this may involve retrieving information from the forwarding table maintained by the PE device in order to generate the subset to include all local CE devices that are root devices.

At 610, the process 600 may involve transmitting the frame to each of the root CE devices that are included in the subset of the multiple local CE devices. Note that if the frame originated at a root device, the frame is forwarded by the provider edge device to each of the multiple local customer edge devices. In contrast, if the frame originated at a leaf device, the frame is forwarded only to local CE devices that are root devices. It should be noted that regardless of whether the frame is transmitted to the customer edge device, it may be forwarded to other devices (e.g., other PE devices) operating on the core network.

Figure 7:
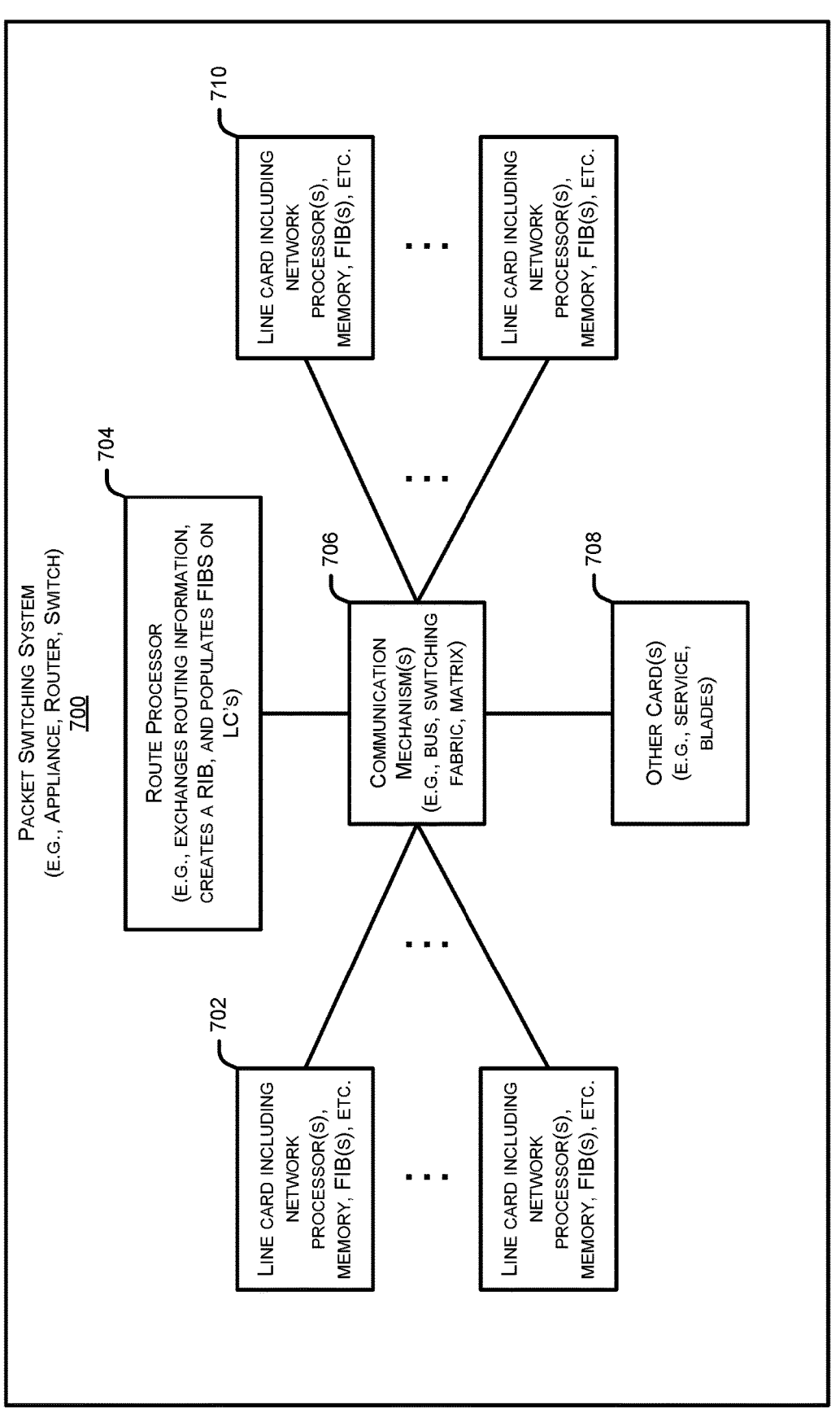
FIG. 7 illustrates a block diagram illustrating an example packet switching device (or system) that can be utilized to implement various aspects of the technologies disclosed herein.

FIG. 7 illustrates a block diagram illustrating an example packet switching device (or system) 700 that can be utilized to implement various aspects of the technologies disclosed herein. In some examples, packet switching device(s) 700 may be employed in various networks, such as, for example, core network 104 as described with respect to FIG. 1.

In some examples, a packet switching device 700 may comprise multiple line cards 702, 710, each with one or more network interfaces for sending and receiving packets over communications links (e.g., possibly part of a link aggregation group). The packet switching device 700 may also have a control plane with one or more processing elements 705 for managing the control plane and/or control plane processing of packets associated with forwarding of packets in a network. The packet switching device 700 may also include other cards 708 (e.g., service cards, blades) which include processing elements that are used to process (e.g., forward/send, drop, manipulate, change, modify, receive, create, duplicate, apply a service) packets associ-ated with forwarding of packets in a network. The packet switching device 700 may comprise hardware-based communication mechanism 706 (e.g., bus, switching fabric, and/or matrix, etc.) for allowing its different entities (e.g., line cards 702, 704, 708 and 710) to communicate. Line cards 702, 710 may typically perform the actions of being both an ingress and/or an egress line card 702, 710, in regard to multiple other particular packets and/or packet streams being received by, or sent from, packet switching device 700.

Figure 8:
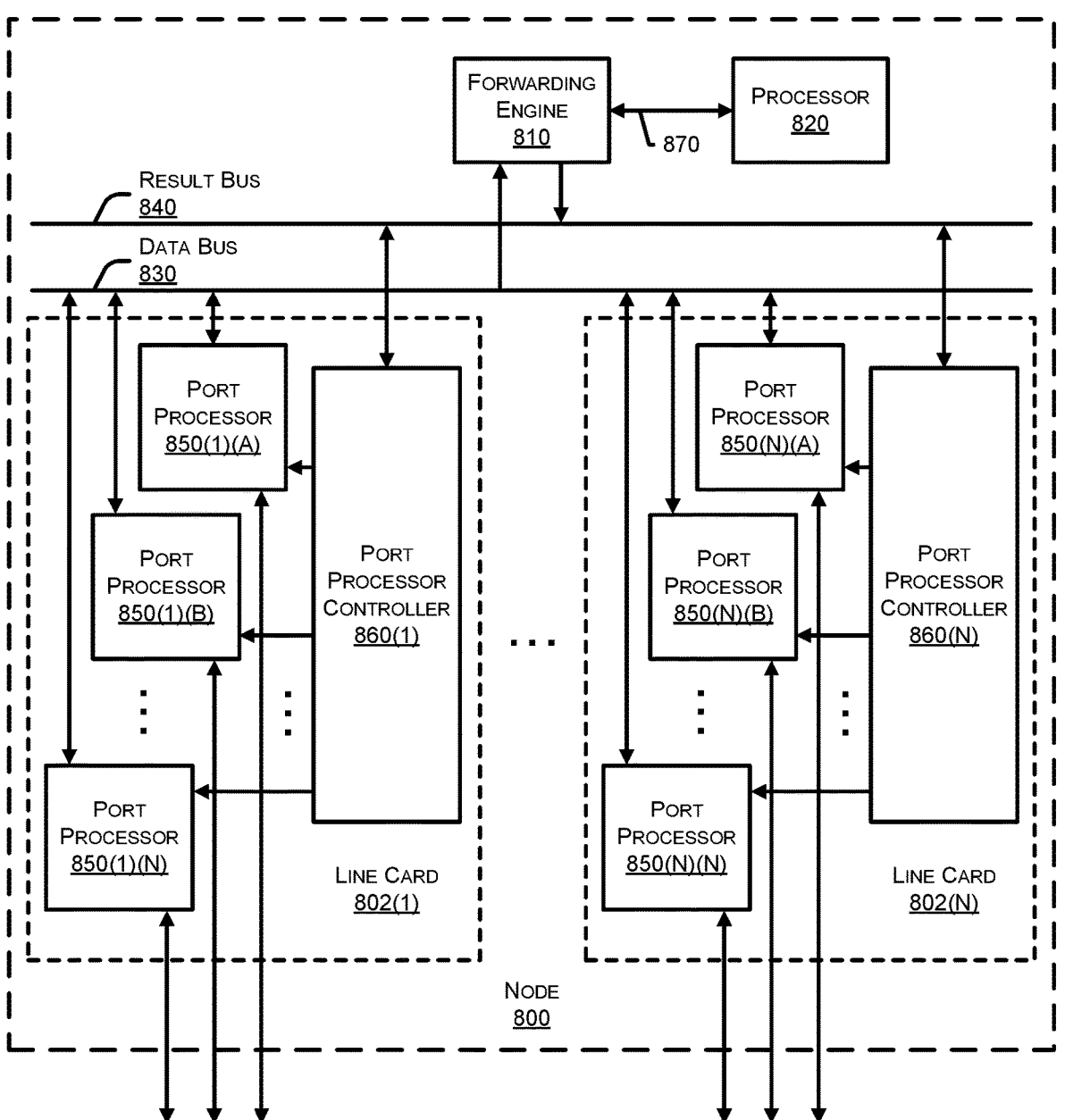
FIG. 8 illustrates a block diagram illustrating certain components of an example node that can be utilized to implement various aspects of the technologies disclosed herein.

FIG. 8 illustrates a block diagram illustrating certain components of an example node 800 that can be utilized to implement various aspects of the technologies disclosed herein. In some examples, node(s) 800 may be employed in various networks, such as, for example, core network 104 as described with respect to FIG. 1.

In some examples, node 800 may include any number of line cards 802 (e.g., line cards 802 (1)-(N), where N may be any integer greater than 1) that are communicatively coupled to a forwarding engine 810 (also referred to as a packet forwarder) and/or a processor 820 via a data bus 830 and/or a result bus 840. Line cards 802 (1)-(N) may include any number of port processors 850 (1) (A)-(N) (N) which are controlled by port processor controllers 860 (1)-(N), where N may be any integer greater than 1. Additionally, or alternatively, forwarding engine 810 and/or processor 820 are not only coupled to one another via the data bus 830 and the result bus 840, but may also communicatively coupled to one another by a communications link 870.

The processors (e.g., the port processor(s) 850 and/or the port processor controller(s) 860) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor(s) 850 (1) (A)-(N) (N) at which the packet or packet and header was received and to one or more of those devices coupled to the data bus 830 (e.g., others of the port processor(s) 850 (1) (A)-(N) (N), the forwarding engine 810 and/or the processor 820). Handling of the packet or packet and header may be determined, for example, by the forwarding engine 810. For example, the forwarding engine 810 may determine that the packet or packet and header should be forwarded to one or more of port processors 850 (1) (A)-(N) (N). This may be accomplished by indicating to corresponding one(s) of port processor controllers 860 (1)-(N) that the copy of the packet or packet and header held in the given one(s) of port processor(s) 850 (1) (A)-(N) (N) should be forwarded to the appropriate one of port processor(s) 850 (1) (A)-(N) (N). Additionally, or alternatively, once a packet or packet and header has been identified for processing, the forwarding engine 810, the processor 820, and/or the like may be used to process the packet or packet and header in some manner and/or maty add packet security information in order to secure the packet. On a node 800 sourcing such a packet or packet and header, this processing may include, for example, encryption of some or all of the packet's, or packet and header's, information, the addition of a digital signature, and/or some other information and/or processing capable of securing the packet or packet and header. On a node 800 receiving such a processed packet or packet and header, the corresponding process may be performed to recover or validate the packet's, or packet and header's, information that has been secured.

Figure 9:
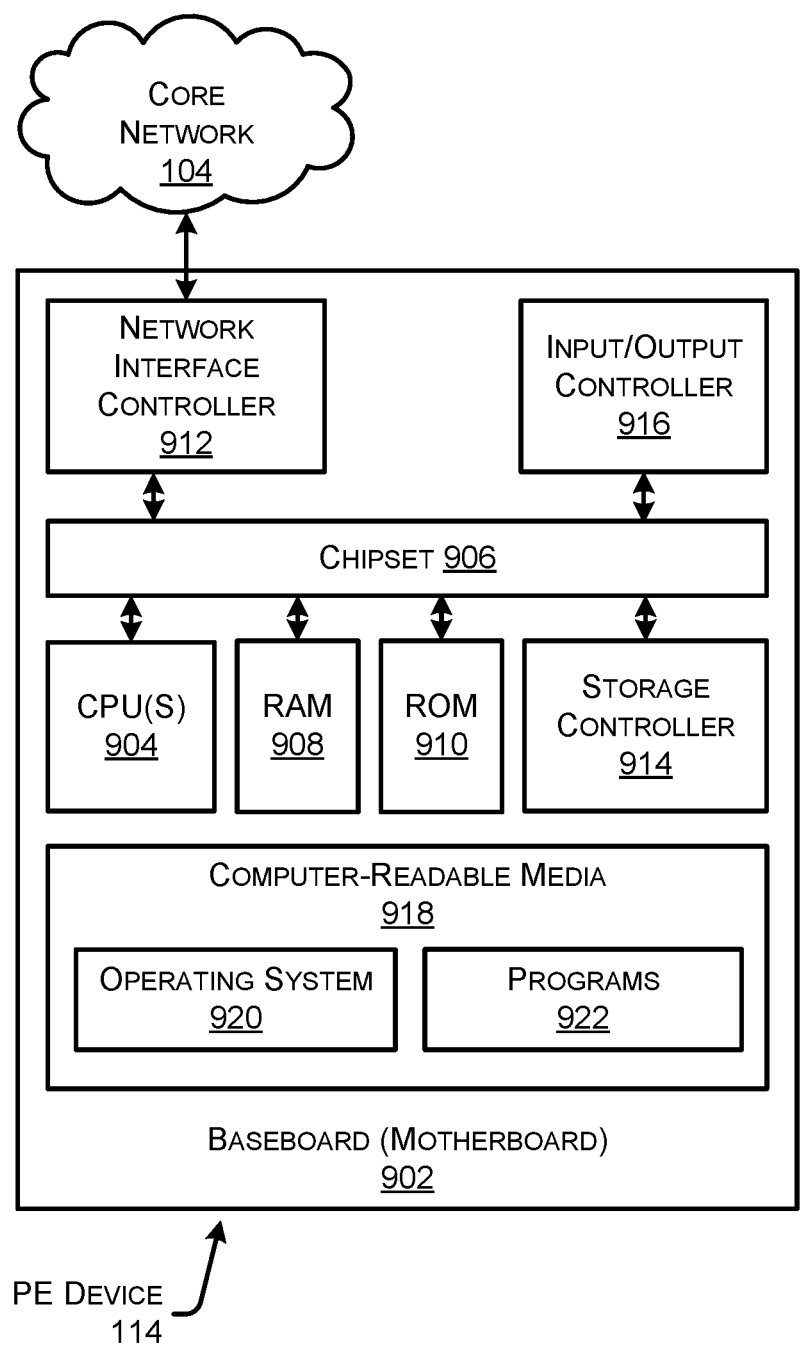
FIG. 9 shows an example computer architecture for a provider edge device capable of executing program components for implementing the functionality described above.

FIG. 9 shows an example computer architecture for a provider edge device 114 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The provider edge device may, in some examples, correspond to a physical server as described herein, and may comprise networked devices such as servers, switches, routers, hubs, bridges, gateways, modems, repeaters, access points, etc.

The provider edge device 114 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the provider edge device 114.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer baseboard 902. The chipset 906 can further provide an interface to a computer-readable storage medium such as a read-only memory ("ROM") 910 or non-volatile RAM ("NVRAM") for storing basic routines that help to startup the provider edge device 114 and to transfer information between the various components and devices. The ROM 910 or NVRAM can also store other software components necessary for the operation of the provider edge device 114 in accordance with the configurations described herein.

The provider edge device 114 can operate in a networked environment using logical connections to remote computing devices and computer systems through a network, such as the core network 104. The chipset 906 can include functionality for providing network connectivity through a NIC 912, such as a gigabit Ethernet adapter. The NIC 912 is capable of connecting the provider edge device 114 to other computing devices over the core network 104. It should be appreciated that multiple NICs 912 can be present in the provider edge device 114, connecting the computer to other types of networks and remote computer systems.

The provider edge device 114 can be connected to a storage device 918 that provides non-volatile storage for the computer. The storage device 918 can store an operating system 920, programs 922, and data, which have been described in greater detail herein. The storage device 918 can be connected to the provider edge device 114 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The provider edge device 114 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the provider edge device 114 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The provider edge device 114 can further read information from the storage device 918 by detecting the physical states or characteristics of one or more particular locations within the physical storage units.

In addition to the mass storage device 918 described above, the provider edge device 114 can have access to other computer-readable storage media to store and retrieve information, such as program modules, data structures, or other data. It should be appreciated by those skilled in the art that computer-readable storage media is any available media that provides for the non-transitory storage of data and that can be accessed by the provider edge device 114. In some examples, the operations performed by devices as described herein may be supported by one or more devices similar to provider edge device 114. Stated otherwise, some or all of the operations performed by an edge device, and/or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the provider edge device 114. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the provider edge device 114.

In one embodiment, the storage device 918 or other computer-readable storage media is encoded with computer-executable instructions which, when loaded into the provider edge device 114, transform the computer from a general-purpose computing system into a special-purpose computer capable of implementing the embodiments described herein. These computer-executable instructions transform the provider edge device 114 by specifying how the CPUs 904 transition between states, as described above. According to one embodiment, the provider edge device 114 has access to computer-readable storage media storing computer-executable instructions which, when executed by the provider edge device 114, perform the various processes described above with regard to the other figures. The provider edge device 114 can also include computer-readable storage media having instructions stored thereupon for performing any of the other computer-implemented operations described herein.

The provider edge device 114 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the provider edge device 114 might not include all of the components shown in FIG. 9, can include other components that are not explicitly shown in FIG. 9, or might utilize an architecture completely different than that shown in FIG. 9.

As described herein, the provider edge device 114 may include one or more hardware processors (e.g., CPU 904) (processors) configured to execute one or more stored instructions. The processor(s) (e.g., CPU 904) may comprise one or more cores. Further, the provider edge device 114 may include one or more network interfaces configured to provide communications between the provider edge device 114 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the core network 104. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 922 may comprise any type of programs or processes to perform the techniques described in this disclosure. The programs 922 may comprise any type of program that cause the computing device to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV). Dynamic Source Routing (DSR). DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below. PE Module may also include computer executable instructions that, when executed by processor(s), cause computing device to perform the techniques described herein. To do so, in some embodiments. PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often. M is a statistical model, and the cost function is inversely proportional to the likelihood of M, given the input data.

In various embodiments. PE Module may employ one or more supervised, unsupervised, or semi-supervised machine learning models. Generally, supervised learning entails the use of a training set of data, as noted above, that is used to train the model to apply labels to the input data. For example, the training data may include sample input data that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In a core network 104 made up of software defined wide area networks (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
maintaining, at a provider edge device, information about a set of local customer edge devices in communication with the provider edge device;
receiving, by the provider edge device from a second provider edge device, a multi-destination frame to be received by multiple customer edge devices;
determining, by the provider edge device based on a bit indicator included in the multi-destination frame, if a device at which the multi-destination frame originated is a root device, the bit indicator having been added to the multi-destination frame by the second provider edge device based on a status of an originating customer edge device;
upon determining that the device at which the multi-destination frame originated is not a root device, identifying, by the provider edge device, a subset of the set of local customer edge devices associated with a root status; and
providing, by the provider edge device, the multi-destination frame to the subset of the set of local customer edge devices while not providing the multi-destination frame to local customer edge devices outside of the subset.

2. The method of claim 1, wherein the a bit indicator included in the multi-destination frame is included in a header of the multi-destination frame.

3. The method of claim 1, wherein the a bit indicator included in the multi-destination frame is included in an identifier of the multi-destination frame.

4. The method of claim 1, further comprising forwarding the multi-destination frame to at least one third provider edge device.

5. The method of claim 1, wherein the bit indicator included in the multi-destination frame comprises a single bit value.

6. The method of claim 1, wherein the identifying the subset of the set of local customer edge devices associated with a root status is based at least in part on information included in a forwarding table maintained by the provider edge device.

7. The method of claim 6, wherein the forwarding table includes an indication of a port and a role status for the set of local customer edge devices in communication with the provider edge device.

8. The method of claim 1, wherein the multi-destination frame is provided to the provider edge device over a communication connection in a Non-Multi-Protocol Label Switching network.

9. A provider edge device comprising:

one or more processors; and one or more non-transitory computer-readable media storing computer-executable instructions that, when executed by the one or more processors, cause the provider edge device to perform operations comprising:

maintaining information about a set of local customer edge devices in communication with the provider edge device;

receiving, from a second provider edge device, a frame to be received by multiple customer edge devices;

determining, based on a bit indicator included in the frame, if a device at which the frame originated is a root device, the bit indicator having been added to the multi-destination frame by the second provider edge device based on a status of an originating customer edge device;

upon determining that the device at which the frame originated is not a root device, identifying a subset of the set of local customer edge devices associated with a root status; and providing the frame to the subset of the set of local customer edge devices.

10. The provider edge device of claim 9, wherein the bit indicator included in the frame comprises a bit indicator included in a header of the frame.

11. The provider edge device of claim 9, wherein the bit indicator included in the frame comprises a bit indicator included in an identifier of the frame.

12. The provider edge device of claim 9, wherein the operations further comprise forwarding the frame to at least one third provider edge device.

13. The provider edge device of claim 9, wherein the bit indicator included in the frame comprises a single bit value.

14. The provider edge device of claim 9, wherein the subset of the set of local customer edge devices is determined based on information stored in a forwarding table maintained by the provider edge device.

15. One or more non-transitory computer-readable media storing computer-executable instructions that, when executed by one or more processors, cause the one or more processors to perform operations comprising:

maintaining information about a set of local customer edge devices;

receiving, from a sending provider edge device, a frame to be received by multiple customer edge devices;

determining, based on a bit indicator included in the frame, if a device at which the frame originated is a root device, the bit indicator having been added to the multi-destination frame by the sending provider edge device based on a status of an originating customer edge device;

upon determining that the device at which the frame originated is not a root device, identifying a subset of the set of local customer edge devices associated with a root status; and providing the frame to the subset of the set of local customer edge devices.

16. The one or more non-transitory computer-readable media of claim 15, wherein the bit indicator included in the frame comprises a single bit value.

17. The one or more non-transitory computer-readable media of claim 15, wherein the bit indicator included in the frame comprises a bit indicator included in a header of the frame.

18. The one or more non-transitory computer-readable media of claim 15, wherein the bit indicator included in the frame comprises a bit indicator included in an identifier of the frame.

19. The one or more non-transitory computer-readable media of claim 15, wherein the identifying a subset of the set of local customer edge devices associated with a root status is based at least in part on information included in a forwarding table maintained in the computer-readable media.

20. The one or more non-transitory computer-readable media of claim 19, wherein the forwarding table includes an indication of a role status for the multiple local customer edge devices.

* * * * *